United States Patent
Tsuchida et al.

(10) Patent No.: US 9,397,554 B2
(45) Date of Patent: Jul. 19, 2016

(54) MOTOR DRIVE DEVICE HAVING FUNCTION OF ESTIMATING DEAD TIME IN OUTPUT STAGE

(71) Applicant: FANUC CORPORATION, Yamanashi (JP)

(72) Inventors: Kunio Tsuchida, Yamanashi (JP); Taku Sasaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/753,465

(22) Filed: Jun. 29, 2015

(65) Prior Publication Data

US 2016/0013739 A1     Jan. 14, 2016

(30) Foreign Application Priority Data

Jul. 11, 2014 (JP) .................................. 2014-143626

(51) Int. Cl.
*H02P 6/14* (2016.01)
*H02M 1/38* (2007.01)

(52) U.S. Cl.
CPC .......... *H02M 1/38* (2013.01); *H02M 2001/385* (2013.01)

(58) Field of Classification Search
CPC ........................ H02M 2001/385; H02M 1/03
USPC ...................... 318/803, 801, 400.26
See application file for complete search history.

(56) References Cited

U.S. PATENT DOCUMENTS

| 6,362,593 B1* | 3/2002 | Lee .......................... H02P 27/08 318/722 |
| 7,541,769 B2* | 6/2009 | Nawa ................. H02M 7/53875 318/632 |
| 2014/0321182 A1* | 10/2014 | Takamatsu ................ B60L 7/14 363/132 |

FOREIGN PATENT DOCUMENTS

JP         2012254682 A     12/2012

OTHER PUBLICATIONS

English Abstract and machine translation for Japanese Publication No. 2012-254682 published Dec. 27, 2012, 23 pgs.

* cited by examiner

*Primary Examiner* — Eduardo Colon Santana
*Assistant Examiner* — Bickey Dhakal
(74) *Attorney, Agent, or Firm* — Fredrikson & Byron, P.A.

(57) ABSTRACT

A motor drive device includes an inverter for generating an AC voltage from a DC voltage by switching power elements, a current detection unit for detecting a current to be inputted to a motor, a current controller for generating a voltage command from a current command and a current detection value, a gate drive command generator for generating drive commands for the power elements such that a dead time in an output stage, that is a period of time in which both of the power elements for upper and lower arms that compose the output stage of the inverter are turned off, becomes a predetermined value, a gate drive circuit unit for outputting gate drive signals for the power elements, and a dead time estimator for estimating the dead time in the output stage that is produced by the gate drive signals for the power elements.

6 Claims, 8 Drawing Sheets

US 9,397,554 B2

MOTOR DRIVE DEVICE HAVING FUNCTION OF ESTIMATING DEAD TIME IN OUTPUT STAGE

CROSS-REFERENCE TO RELATED APPLICATIONS

This application is a new U.S. patent application that claims benefit of JP 2014-143626, filed on Jul. 11, 2014, the entire content of JP 2014-143626 is hereby incorporated by reference.

FIELD OF THE INVENTION

The present invention relates to a motor drive device, and more specifically to the motor drive device having the function of estimating a dead time in an output stage.

BACKGROUND OF THE INVENTION

FIG. 1 shows an example of the representative structure of a motor drive device of a motor to drive a feed shaft and a main shaft of a machine tool, arms of an industrial machine or an industrial robot, or the like. FIG. 1 is a circuit for the motor drive device that produces three-phase alternating current power from a direct current power supply. By applying drive signals to gates of power elements Tr1 to Tr6 that are switching elements, which consist of three pairs of upper and lower power elements each for a U-phase, a V-phase, and a W-phase contained in an inverter 100, the power elements are turned on and off to feed electric power to a motor 10. Diodes D1 to D6 are connected in parallel to the power elements Tr1 to Tr6, respectively. A current flowing through the motor 10 is detected by a current detection unit 200, which includes a U-phase current detector 201 and a V-phase current detector 202, and fed back to a current controller 300.

At this time, the pair of upper and lower power elements are alternately turned on and off, and a period of time (dead time) in which both of the power elements are necessarily turned off is provided at the instant of switching the turn on and off of the two power elements of a certain phase (see FIG. 2). This is because turning on the pair of upper and lower power elements at the same time causes the upper and lower power elements to short out, and a large current flowing through the power elements breaks the power elements.

The dead time will be described with reference to FIG. 2. FIG. 2 shows waveforms of signals A and B. The signal A (A') is applied to the gate of the U-phase upper arm power element Tr1, and the signal B (B') is applied to the gate of the U-phase lower arm power element Tr2. The power element is turned on when the signal A or B is at a high level, and turned off when the signal A or B is at a low level. As described above, when both of the signals A and B are at the high level, the U-phase upper arm power element Tr1 and the U-phase lower arm power element Tr2 are turned on at the same time, and the power elements in a short state may possibly break down. Accordingly, in order to prevent the signals A and B from being at the high level simultaneously, the dead time that is the period of time in which both of the upper arm power element Tr1 and the lower arm power element Tr2 are turned off, in other words, both of the signals A and B are at the low level provided at the instant of switching the turn on and off of the upper arm power element Tr1 and the lower arm power element Tr2, which compose an output stage of the inverter 100. This dead time has a width for a certain duration, for example, a dead time Tset set by a gate drive command generator 400.

The drive motor applies a voltage to the motor and controls a current flowing through the motor in order to rotate the motor at a desired rotating speed or stop the motor in a desired position. However, the presence of the dead time, as described above, interferes with application of a desired voltage to the motor and a flow of a desired current through the motor.

A technique (hereinafter referred to as "dead time correction") for correcting the effect of the dead time is known in which a voltage is added to a voltage command by a deficiency owing to the dead time or a voltage is subtracted from the voltage command by an excess owing thereto (For example, Japanese Patent Application Laid-Open No. 2012-254682 (JP 2012-254682 A)).

The proper functioning of the dead time correction is predicated upon a proper grasp of the dead time. In an actual motor drive device, as shown in FIG. 1, the signal A and the signal B, which are produced by the gate drive command generator 400 to turn on and off the power elements, pass through an upper arm gate drive circuit 501 and a lower arm gate drive circuit 502 included in a gate drive circuit 500, respectively, for isolation and amplification, and enter the gates of the power elements as a signal A' and a signal B' in actual fact. As a result, the signal A' and the signal B', being signals to turn on and off the power elements, are delayed in passing through the gate drive circuit 500. This delay is sensitive to variations in properties of circuit components and the like, and is inconstant.

A variation in the dead time owing to passing through the gate drive circuit 500, as described above, will be described with reference to the drawings. FIG. 3 shows the waveforms of the signal A and the signal B, which are produced by the gate drive command generator 400 to turn on and off the power elements, and the signal A' and the signal B', which are isolated and amplified through gate drive circuit 500 and actually inputted to the gates of the power elements Tr1 and Tr2. The signal A' is delayed by a time Ta relative to the signal A by passing through the upper arm gate drive circuit 501. In a like manner, the signal B' is delayed by a time Tb relative to the signal B by passing through the lower arm gate drive circuit 502. When Tset refers to the dead time of the signal A and the signal B set by the gate drive command generator 400, a dead time T of the signal A' and the signal B' at the gates of the upper arm and lower arm power elements, respectively, is represented by T=Tset+(Ta−Tb). It should be noted that, as shown in FIG. 3, Ta is not necessarily equal to Tb. Accordingly, there occurs a case where T is unequal to Tset.

In this manner, as shown in FIG. 3, there is a case in which the dead time T at the gates of the power elements is different from the value Tset set by the gate drive command generator 400. Furthermore, time for the power elements to turn on and off in response to the signals inputted to the gates vary from one power element to another, and is represented as difference in the dead time in output stages of the power elements.

Namely, even if the gate drive command generator 400 applies the dead time correction to the dead time Tset set by the gate drive command generator 400, the dead time correction is not necessarily appropriate in the output stages of the power elements. If anything, such a correction may bring about an excess or a deficiency of the correction, and adversely affect current control of the motor. According to the conventional technique, as described above, it is difficult to correctly grasp the dead time T in the output stages of the power elements, and therefore the dead time correction cannot be performed in an appropriate manner.

For this problem, it is conceivable to add a voltage measurement circuit or the like in the output stage of the power element for the purpose of measuring an actual dead time in the output stages of the power elements. However, the addition of the circuit causes a disadvantage in mount size and cost. There are also various problems e.g. a requirement for isolation between a primary circuit and a secondary circuit, a measurement error in the circuit, and the like.

An object of the present invention is to provide a motor drive device that can correctly estimate the dead time in the output stages of the power elements with the use of an existing circuit without any additional circuit.

SUMMARY OF THE INVENTION

A motor drive device according to an embodiment of the present invention is a motor drive device of a motor to drive a feed shaft and a main shaft of a machine tool, arms of an industrial machine or an industrial robot, or the like. The motor drive device is characterized in including an inverter, a current detection unit, a current controller, a gate drive command generator, a gate drive circuit unit, and a dead time estimator. The inverter, having a plurality of power elements, generates an alternating current voltage for driving the motor from a direct current voltage by switching of the plurality of power elements. The current detection unit detects a current to be inputted from the inverter to the motor. The current controller generates a voltage command from a current command and a current detection value detected by the current detection unit. The gate drive command generator generates drive commands for the plurality of power elements upon receiving the voltage command from the current controller, such that a dead time in an output stage, that is a period of time in which both of the power elements for an upper arm and a lower arm that compose the output stage of the inverter are turned off, becomes a predetermined value. The gate drive circuit unit outputs signals to drive the gates of the plurality of power elements, upon receiving the drive commands from the gate drive command generator. The dead time estimator estimates the dead time in the output stage that is produced by the signals to drive the gates of the plurality of power elements, from a difference between the current command and the current detection value.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

A motor drive device according to the present invention will be hereinafter described with reference to the drawings. It should be noted that the technical scope of the present invention is not limited to embodiments thereof, but extends to the invention described in claims and equivalents thereof.

First Embodiment

Figure 4:
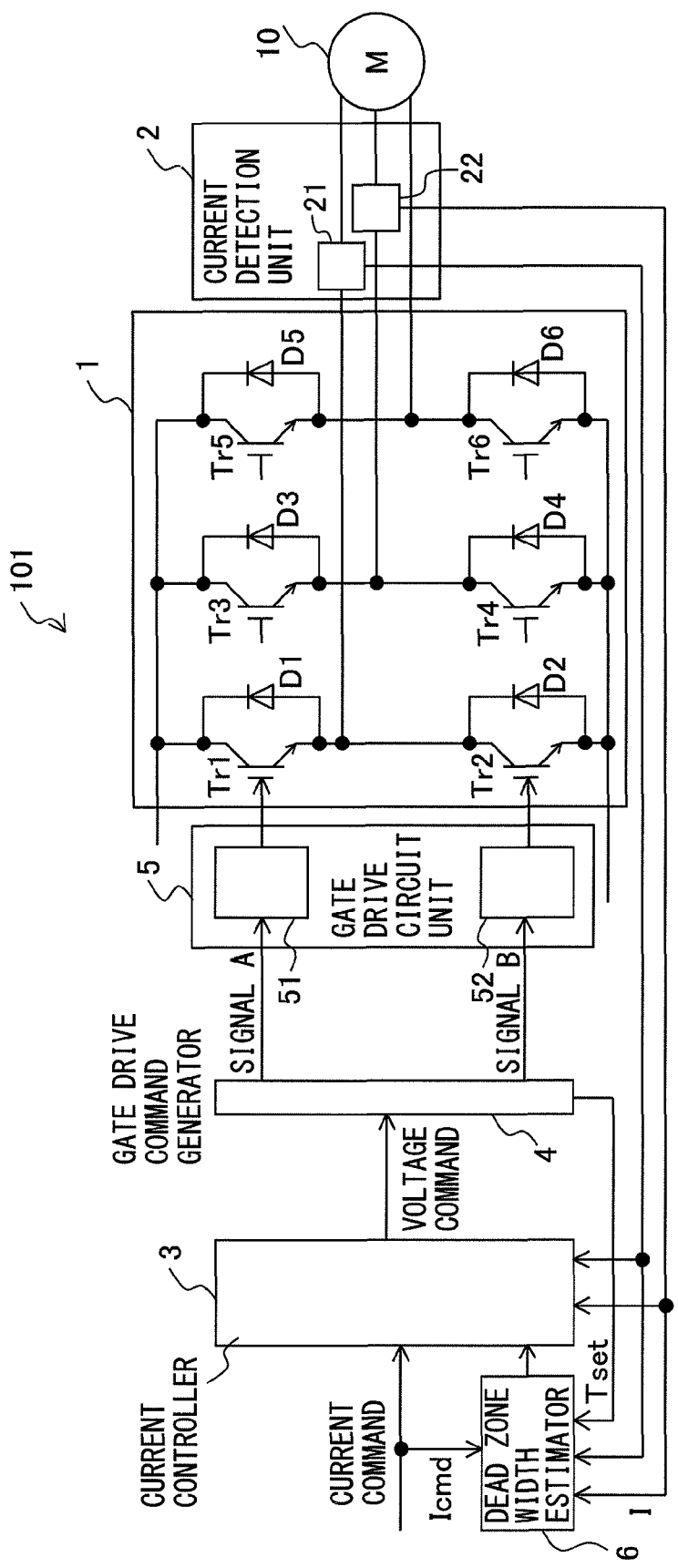
FIG. 4 is a block diagram of a motor drive device according to a first embodiment of the present invention.

A motor drive device according to a first embodiment of the present invention will be described with reference to the drawings. FIG. 4 shows the structure of the motor drive device according to the first embodiment of the present invention. A motor drive device 101 according to the first embodiment of the present invention, which controls the operation of a motor 10 to drive a feed shaft and a main shaft of a machine tool, arms of an industrial machine or an industrial robot, or the like, has an inverter 1, a current detection unit 2, a current controller 3, a gate drive command generator 4, a gate drive circuit unit 5, and a dead time estimator 6.

The inverter 1 is provided with a plurality of power elements Tr1 to Tr6, and generates an alternating current voltage to drive the motor 10 from a direct current voltage by switching of the plurality of power elements. This embodiment describes a three-phase inverter as an example. As the six power elements Tr1 to Tr6, for example, IGBTs are available. Reflux diodes D1 to D6 are provided in parallel to the power elements Tr1 to Tr6, respectively. Tr1 is a U-phase upper arm power element, and Tr2 is a U-phase lower arm power element. Tr3 is a V-phase upper arm power element, Tr4 is a V-phase lower arm power element. Tr5 is a W-phase upper arm power element, and Tr6 is a W-phase lower arm power element.

The current detection unit 2 detects an electric current to be inputted from the inverter 1 to the motor 10. In the motor drive device 101 according to the first embodiment, as shown in FIG. 4, the current detection unit 2 includes a U-phase current detector 21 and a V-phase current detector 22. This embodiment takes the case of detecting a U-phase current and a V-phase current as an example, but is not limited to this. Only one of three phase currents may be detected, or the other pairs out of the three phase currents, i.e., the U-phase current and a W-phase current, or the V-phase current and the W-phase current may be detected, or all of the three phase currents may be detected instead. A current detection value I detected by the current detection unit 2 is outputted to the current controller 3 and the dead time estimator 6. In this embodiment, a U-phase current Iu and a V-phase current Iv are detected, and "I" represents the U-phase current Iu and the V-phase current Iv.

The current controller 3 generates a voltage command from a current command Icmd and the current detection value I detected by the current detection unit 2. The generated voltage command is outputted to the gate drive command generator 4.

Figure 1:
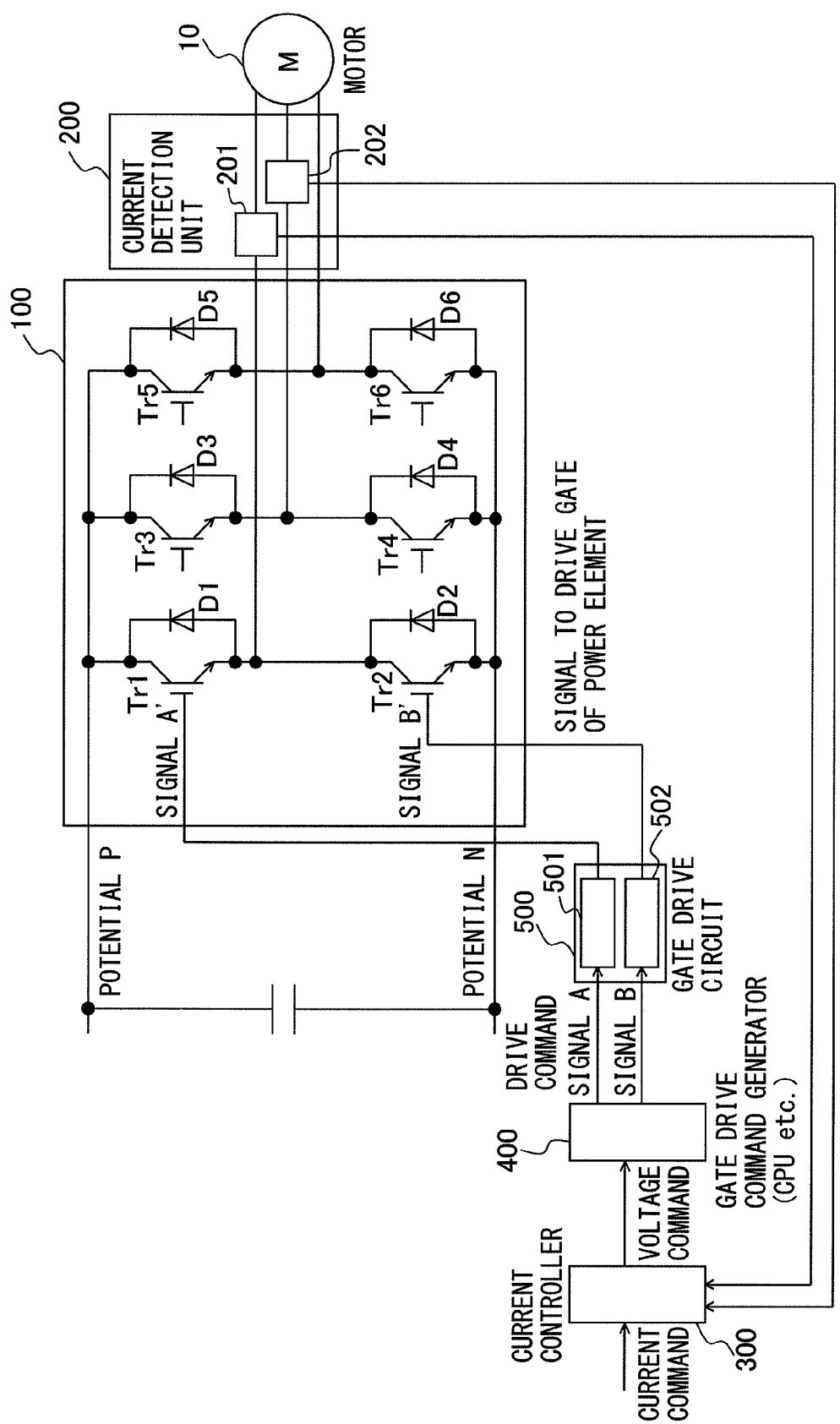
FIG. 1 is a block diagram of a conventional motor drive device.
Figure 2:
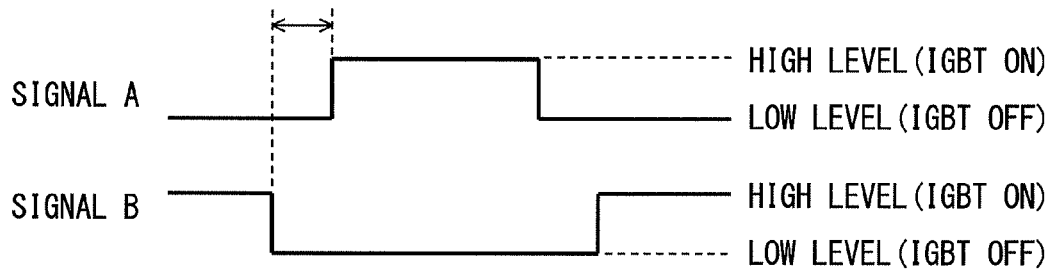
FIG. 2 is a drawing showing drive commands applied to gates of an upper arm power element and a lower arm power elements, that is, waveforms of signals having a dead time set by a gate drive command generator.

Upon receiving the voltage command from the current controller 3, the gate drive command generator 4 generates drive commands for the plurality of power elements such that a dead time in the output stage, that is a period of time in which both of the upper arm power element and the lower arm power element (for example, Tr1 and Tr2) composing the output stage of the inverter 1 are in an off state, is set at a predetermined value Tset. When a signal A represents the drive command to be applied to a gate of the U-phase upper arm power element Tr1, and a signal B represents the drive command to be applied to a gate of the U-phase lower arm power element Tr2, FIG. 2 shows waveforms of the signals A and B. The U-phase upper arm power element Tr1 is turned on when the signal A is at a high level, which is turned off when the signal A is at a low level. In a like manner, the U-phase lower arm power element Tr2 is turned on when the signal B is at the high level, which is turned off when the signal B is at the low level. Thus, when both of the signals A and B are at the low level, both of the U-phase upper arm power element Tr1 and lower arm power element Tr2 are turned off, and this period establishes the dead time. The gate drive command generator 4 generates the signals A and B, which are the drive commands for the U-phase upper arm power element and lower arm power element, such that this dead time coincides with the predetermined value Tset. The drive commands are outputted to the gate drive circuit unit 5.

Upon receiving the drive commands from the gate drive command generator 4, the gate drive circuit unit 5 outputs signals for driving the gates of the plurality of power elements. The gate drive circuit unit 5 includes an upper arm gate drive circuit 51 and a lower arm gate drive circuit 52. The upper arm gate drive circuit 51 drives the U-phase upper arm power element Tr1, the V-phase upper arm power element Tr3, and the W-phase upper arm power element Tr5. On the other hand, the lower arm gate drive circuit 52 drives the U-phase lower arm power element Tr2, the V-phase lower arm power element Tr4, and the W-phase lower arm power element Tr6.

Figure 3:
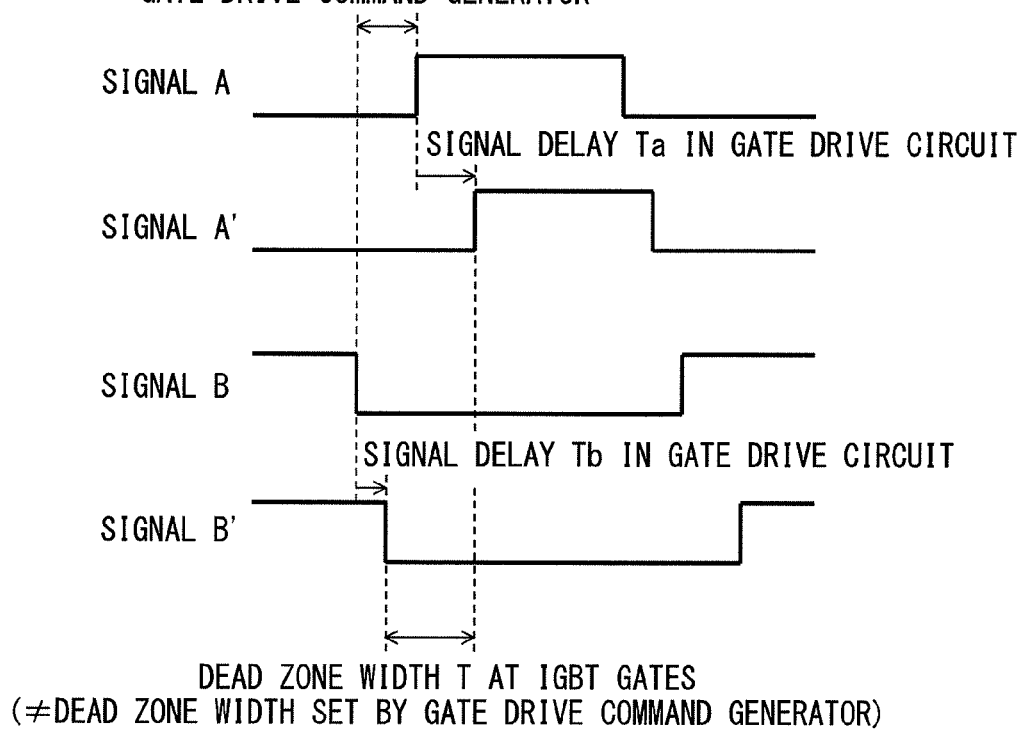
FIG. 3 is a drawing showing the drive commands for a plurality of the power elements generated by the gate drive command generator, and waveforms of signals outputted from a gate drive circuit unit to drive the gates of the power elements.

For example, FIG. 3 shows waveforms of signals A' and B', wherein the signal A' represents a drive command applied to the gate of the U-phase upper arm power element Tr1, and the signal B' represents a drive command applied to the gate of the U-phase lower arm power element Tr2. As described above, the signal A' being the drive command applied to the gate of the U-phase upper arm power element Tr1 is delayed by a certain time Ta, relative to the signal A being the drive command for the U-phase upper arm power element Tr1 generated by the gate drive command generator 4. In a like manner, the signal B' being the drive command applied to the gate of the U-phase lower arm power element Tr2 is delayed by a certain time Tb, relative to the signal B being the drive command for the U-phase lower arm power element Tr2 generated by the gate drive command generator 4. If Ta and Tb are equal, a dead time T in output stages of the power elements in which both of the signals A' and B' are at the low level should coincide with the value Tset set by the gate drive command generator 4 in which both of the signals A and B are at the low level. However, since the signal A' is generated by the upper arm gate drive circuit 51 and the signal B' is generated by the lower arm gate drive circuit 52, the delay times Ta and Tb differ from each other due to the difference in properties between parts composing the upper arm gate drive circuit 51 and parts composing the lower arm gate drive circuit 52. Accordingly, the dead time T in the output stages of the power elements does not always coincide with the value Tset set by the gate drive command generator 4. The present invention estimates the dead time T in the output stages of the power elements from current detection value and the value Tset set by the gate drive command generator 4. A method for the estimation will be described later.

The dead time estimator 6 estimates the dead time T in the output stage, which is produced by the signals to drive the gates of the plurality of power elements, from the difference E between the current command Icmd and the current detection value I.

For example, from the difference E (=Icmd−I) between the current command Icmd and the current detection value I and the dead time Tset set by the gate drive command generator, the dead time T produced by the signals to drive the gates of the plurality of power elements is estimated as follows with the use of constants A and B:

$$T = Tset + A \times (E - B) \quad (1)$$

Next, the estimation method of the dead time T will be described in detail. In motor drive devices, there is a method for evaluating a current control system in which step commands are applied as current commands and responses thereto of a current detection value are measured (current step response measurement).

At this time, if only so-called proportional control by which the next current command is produced in accordance with the difference between the current command and the current detection value is performed in current feedback control, the current command and the current detection value are stabilized in the state of having a constant error (steady error) in a stationary state. The steady error at this time should be at a constant level, which depends on a feedback control system, but actually contains the following errors and the like.

(i) The effect of the difference between the dead time by the gate drive command generator and the dead time in the output stages of the power elements.

(ii) The effect of a detection error by the current detection unit.

By measuring the difference between the current command and the current detection value in the stationary state by the current step response measurement, and extracting the error owing to the above (i) from the difference, the dead time in the output stages of the power elements can be estimated.

A constant error depending on the feedback control system is the same as long as the parameters such as gain of the control system are the same. On the other hand, as the effect of the detection error by the current detection unit described in (ii), for example, it is conceivable that the current detectors of the two phases that are detecting the currents have unbalanced gains or an offset. However, this effect is less than the effect of the dead time, in most instances. If the effect of the unbalanced gains or the offset of the current detectors cannot be ignored, there are separately proposed a method for correcting the unbalanced gains, a method for eliminating the offset, and the like. Using these methods allows reducing the effect of (ii) to a negligible level.

As described above, the error owing to the effect of the dead time is extracted from "the difference between the current command and the current detection value" obtained by the current step response measurement, and thereby the actual dead time in the output stages of the power elements can be estimated. A concrete operation is performed as follows:

A plurality of types of motor drive devices in which the dead time T in the output stages of the power elements has been measured in advance are prepared with respect to variations ($T_1$, $T_2$, $T_3$, . . . ) in the dead time T. Data is collected as below from results of the current step response measurement of the motor drive devices. When E (=Icmd−I) represents the difference between the current command Icmd and the current detection value I, and ΔT (=T−Tset) represents "the difference between the dead time Tset set by the gate drive command generator and the dead time T in the output stages of the power elements", the following expression approximately holds.

$$\Delta T = A \times (E - B) \quad (2)$$

Figure 5:
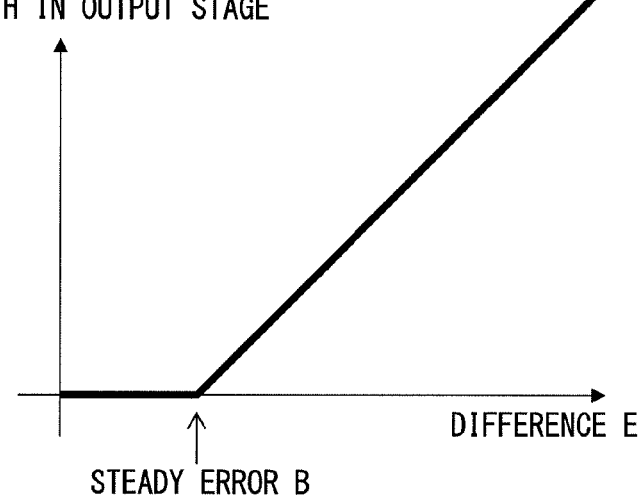
FIG. 5 is a graph showing the relation of the difference E between a current command and a current detection value and the difference ΔT between a dead time Tset set by the gate drive command generator and a dead time T produced by the signals to drive the gates of the plurality of power elements.

FIG. 5 shows the relation of the expression (2). Here, the constant B is the above-described error depending on the feedback control system, and the constant A is a specific coefficient. From the data obtained in advance, the constants A and B of the above expression are calculated by approximation. In a motor drive device, E is actually measured by the current step response measurement, and ΔT is obtained from the above expression with the use of the constants A and B calculated in advance as described above.

According to the method described above, it is possible to easily estimate the dead time T=Tset+ΔT in the output stages of the power elements. Also, since the motor drive device is provided with the current detection unit for use in the current control from the beginning, no additional circuit is required.

Figure 6:
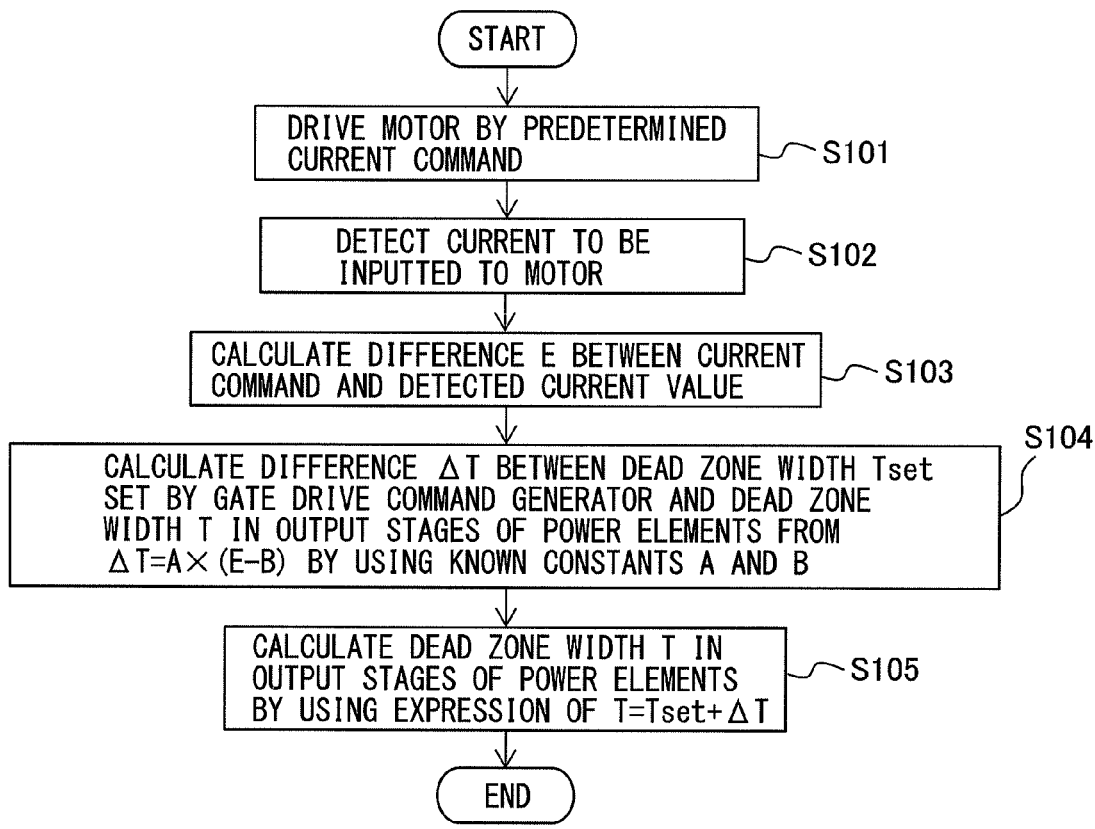
FIG. 6 is a flowchart for explaining an operation process of the motor drive device according to the first embodiment of the present invention.

Next, the estimation method of the dead time in the output stages of the power elements will be described with the use of the motor drive device 101 according to the first embodiment of the present invention. FIG. 6 shows a flowchart for explaining an operation process of the motor drive device 101 according to the first embodiment of the present invention. First, in step S101, the predetermined current command Icmd is issued to actuate the motor 10.

Then, in step S102, the current detection unit 2 detects the current I to be inputted to the motor 10. It should be noted that, although this embodiment describes a situation in which the U-phase current detector 21 and the V-phase current detector 22 are provided and the U-phase current Iu and the V-phase current Iv are detected, the detection current is simply referred to as "I" for the sake of simplicity of explanation.

Then, in step S103, the current controller 3 calculates the difference E (=Icmd−I) between the current command Icmd and the current detection value I.

Then, in step S104, the dead time estimator 6 calculates the difference ΔT between the dead time Tset set by the gate drive command generator 4 and the dead time T in the output stages of the power elements from the expression ΔT=A×(E−B) with the use of the known constants A and B.

Then, in step S105, the dead time estimator 6 calculates the dead time T in the output stages of the power elements by using an expression T=Tset+ΔT.

As described above, it is possible to estimate the dead time in the output stages of the power elements. With the use of the estimated dead time, the current controller 3 adds a voltage to the voltage command by a deficiency due to the dead time or subtracts a voltage from the voltage command by an excess in accordance with the dead time T in the output stage estimated by the dead time estimator 6, in order to correct the effect of the dead time.

The above description takes the case of estimating the dead time in the output stages of the U-phase upper arm power element and lower arm power element as an example, but a dead time as to a V-phase can be estimated in a like manner. Furthermore, providing a W-phase current detector for detecting a W-phase current in the current detection unit 2 allows estimation of a dead time as to a W-phase.

Furthermore, this embodiment describes the case of estimating the dead time of only one phase, but is not limited thereto. The dead time estimator 6 may estimate a dead time in an output stage of each of the three phases by measuring a current flow detected by the current detection unit 2 for a plurality of times with changing a phase of a three-phase current.

Moreover, in estimating the dead time T in the output stage, the current controller 3 may operate in a specific operation mode to estimate the dead time T in the output stage.

Second Embodiment

Figure 7:
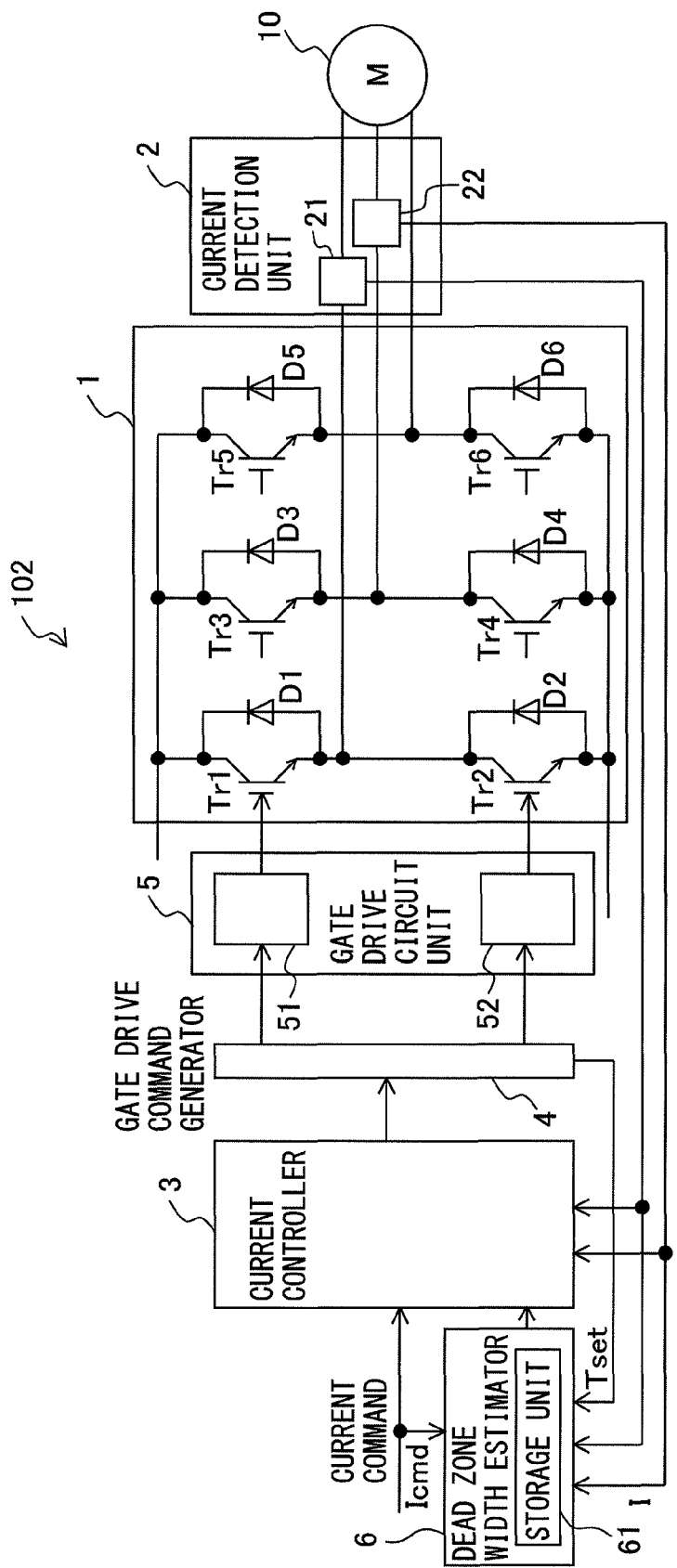
FIG. 7 is a block diagram of a motor drive device according to a second embodiment of the present invention.

Next, a motor drive device according to a second embodiment of the present invention will be described. FIG. 7 shows the structure of a motor drive device 102 according to the second embodiment of the present invention. The motor drive device 102 of the second embodiment is different from the motor drive device 101 of the first embodiment in terms of the dead time estimator 6 having memory 61 that stores data to estimate the dead time T in the output stage. The other components of the motor drive device 102 according to the second embodiment are the same as those of the motor drive device 101 according to the first embodiment, so the detailed description thereof will be omitted.

In the motor drive device 102 according to the second embodiment, the dead time estimator 6 has the memory 61 that stores the data to estimate the dead time T in the output stage. Thus, measurement is performed on various motor drive devices having different dead times T, and even if the constants A and B are unknown in the expression ΔT=A×(E−B) for calculating the difference ΔT between the dead time Tset set by the gate drive command generator 4 and the dead time T in the output stages of the power elements, it is possible to determine the constants A and B by using measurement data stored in the memory 61.

Figure 8:
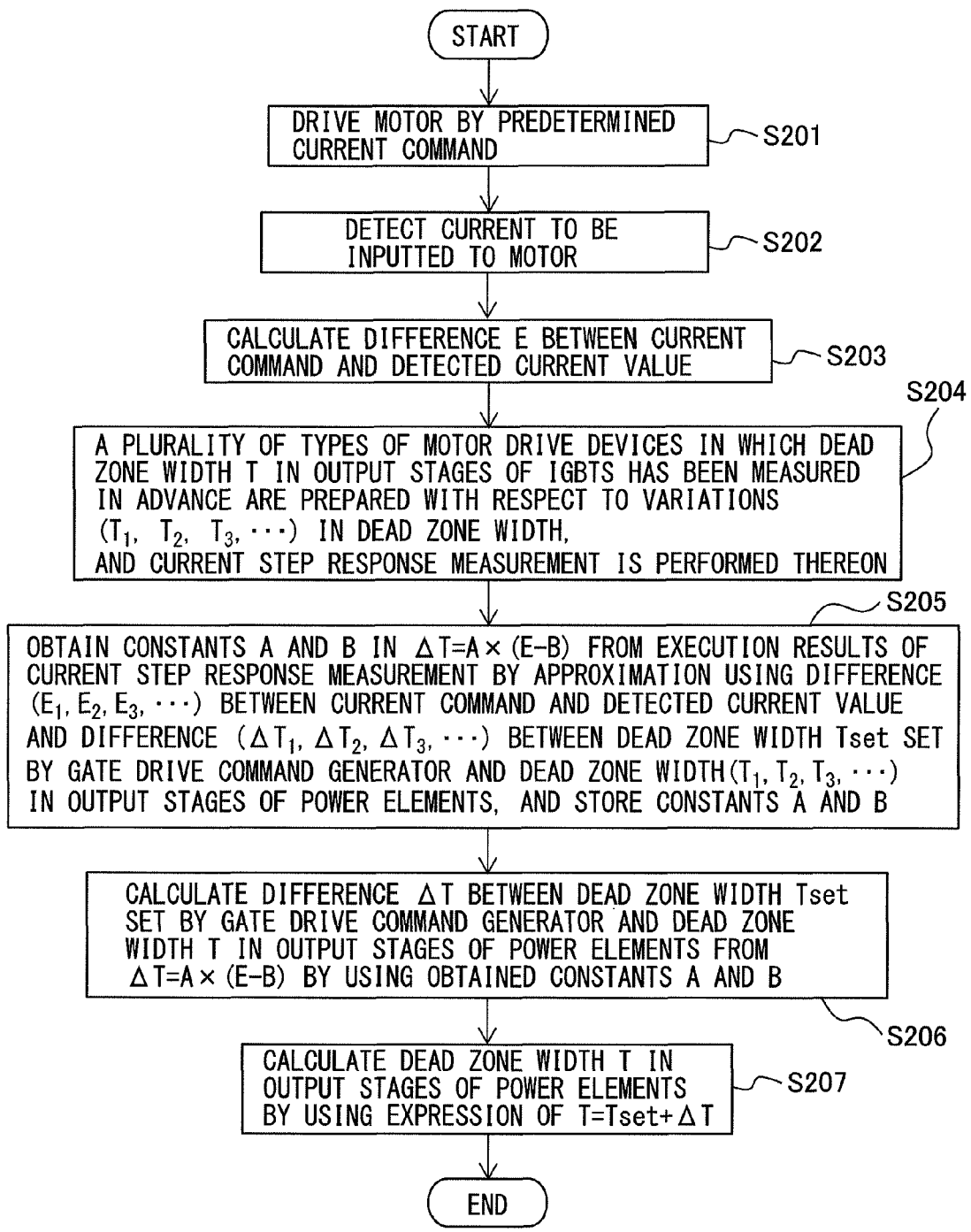
FIG. 8 is a flowchart for explaining an operation process of the motor drive device according to the second embodiment of the present invention.

Next, an operation method of the motor drive device 102 according to the second embodiment of the present invention will be described. FIG. 8 shows a flowchart for explaining an operation process of the motor drive device 102 according to the second embodiment of the present invention. First, in step S201, the predetermined current command Icmd is applied to actuate the motor 10.

Then, in step S202, the current detection unit 2 detects the current I to be inputted to the motor 10. It should be noted that this embodiment describes a situation in which the current detection unit 2 includes the U-phase current detector 21 and the V-phase current detector 22, and the U-phase current Iu and the V-phase current Iv are detected. Just as with the first embodiment, the detection current is simply referred to as "I" for the sake of simplicity of explanation.

Then, in step S203, the current controller 3 calculates the difference E (=Icmd−I) between the current command Icmd and the current detection value I.

Then, in step S204, a plurality of types of motor drive devices in which the dead time T in the output stages of the power elements has been measured in advance are prepared with respect to variations ($T_1$, $T_2$, $T_3$, . . . ) in the dead time T, and the current step response measurement is performed on the plurality of types of motor drive devices.

Then, in step S205, the constants A and B in ΔT =A×(E−B) are calculated from the execution results of the current step response measurement by approximation using the difference ($E_1$, $E_2$, $E_3$, . . . ) between the current command and the current detection value, and the difference ($\Delta T'$, $\Delta T_2$, $\Delta T_3$, . . . ) between the dead time Tset set by the gate drive command generator and the dead time ($T_1$, $T_2$, $T_3$, . . . ) in the output stages of the power elements, and stored.

Figure 9:
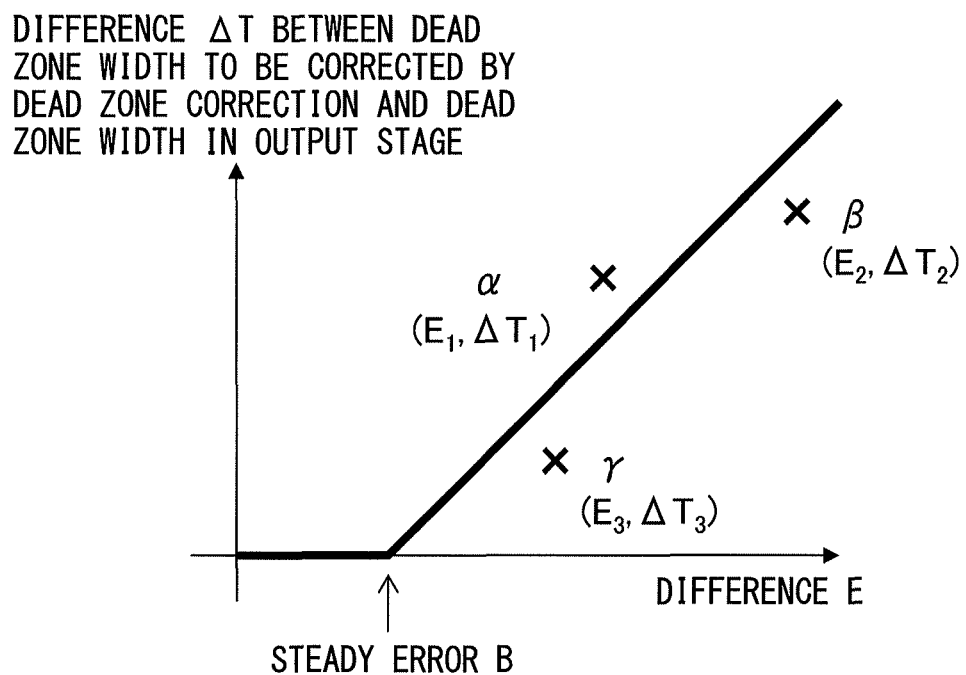
FIG. 9 is a graph showing the relation of the difference E between the current command and the current detection value and the difference ΔT between the dead time Tset set by the gate drive command generator and the dead time T produced by the signals to drive the gates of the plurality of power elements, obtained by results of a plurality of measurements.

A method for calculating the constants A and B from the execution results of the current step response measurement will be described. For example, the case of calculating the constants A and B from results of three measurements will be described as an example. Provided that when $E_1$, $E_2$, and $E_3$ represent the differences between the current command and the current detection value in the three measurements, $\Delta T_1$, $\Delta T_2$, $\Delta T_3$ represent the differences between the dead time Tset set by the gate drive command generator and each of the dead times $T_1$, $T_2$, and $T_3$ in the output stages of the power elements, respectively, these measurement results are plotted as shown in FIG. 9 as measurement points α, β, and γ. Using the measurement data and the method for least squares, the constant A is obtained from the gradient of a straight line and the constant B is obtained from the intersection of the straight line and an x axis.

Then, in step S206, the difference $\Delta T$ between the dead time Tset set by the gate drive command generator and the dead time T in the output stages of the power elements is calculated from $\Delta T = A \times (E-B)$ by using the calculated constants A and B.

Then, in step S207, the dead time estimator 6 calculates the dead time T in the output stages of the power elements by using the expression $T = Tset + \Delta T$.

As described above, according to the motor drive device 102 according to the second embodiment, even if the constants A and B are unknown, it is possible to calculate the constants A and B and obtain the dead time in the output stages of the power elements.

Third Embodiment

Figure 10:
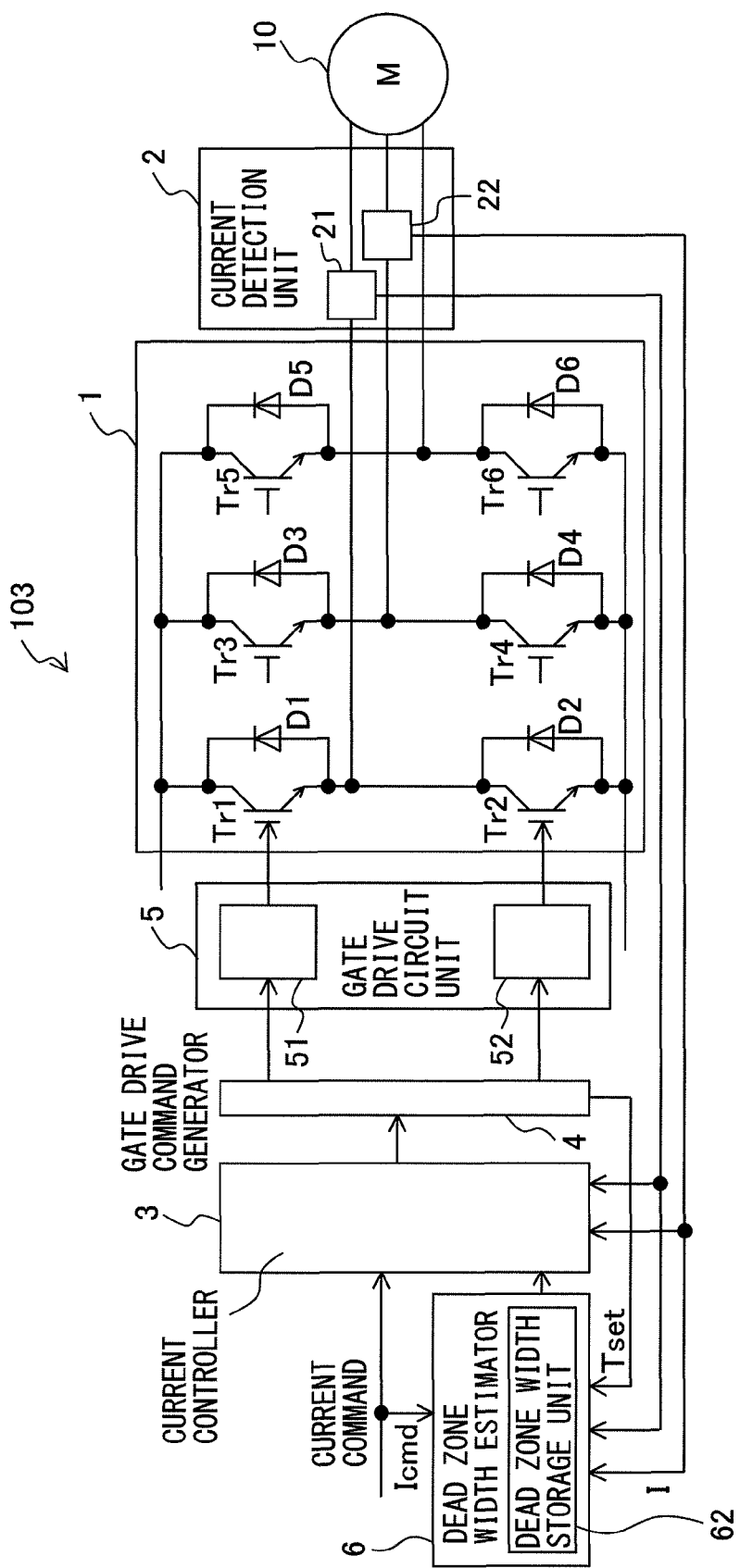
FIG. 10 is a block diagram of a motor drive according to a third embodiment of the present invention.

Next, a motor drive device according to a third embodiment of the present invention will be described. FIG. 10 shows the structure of a motor drive device 103 according to the third embodiment of the present invention. The motor drive device 103 of the third embodiment is different from the motor drive device 101 of the first embodiment in terms of the dead time estimator 6 having dead time memory 62 that stores the estimated dead time T in the output stage. The other components of the motor drive device 103 according to the third embodiment are the same as those of the motor drive device 101 according to the first embodiment, so the detailed description thereof will be omitted.

According to the motor drive device 103 of the third embodiment, the dead time estimator 6 has the dead time memory 62 for storing the estimated dead time T in the output stage. Therefore, with the use of the estimated dead time, the current controller 3 adds a voltage to the voltage command by a deficiency due to the dead time or subtracts a voltage from the voltage command by an excess in accordance with the dead time T in the output stage estimated by the dead time estimator 6, in order to correct the effect of the dead time.

According to the motor drive devices of the present invention, it is possible to estimate the dead time in the output stages of the power elements without providing any additional circuit. As a result, the dead time correction is performed in an appropriate manner, and hence an increase in accuracy of motor current control and by extension an increase in accuracy of motor control can be expected. This contributes to an increase in accuracy of the machine tool and the like.

What is claimed is:

1. A motor drive device of a motor for driving a feed shaft and a main shaft of a machine tool, or arms of an industrial machine or an industrial robot, comprising:
    an inverter having a plurality of power elements, configured to generate an alternating current voltage for driving the motor from a direct current voltage by switching of the plurality of power elements;
    a current detection unit configured to detect a current to be inputted from said inverter to the motor;
    a current controller configured to generate a voltage command from a current command and a current detection value detected by said current detection unit;
    a gate drive command generator configured to generate drive commands for the plurality of power elements upon receiving the voltage command from said current controller, such that a dead time in an output stage, that is a period of time in which both of the power elements for an upper arm and a lower arm that compose the output stage of said inverter are turned off, becomes a predetermined value;
    a gate drive circuit unit configured to output signals to drive gates of the plurality of power elements upon receiving the drive commands from said gate drive command generator; and
    a dead time estimator configured to estimate the dead time in the output stage that is produced by the signals to drive the gates of the plurality of power elements, from a difference between the current command and the current detection value.

2. The motor drive device according to claim 1, wherein said dead time estimator estimates the dead time (T) produced by the signals for driving the gates of the plurality of power elements, from the difference (E) between the current command and the current detection value and a dead time (Tset) set by said gate drive command generator, based on an expression $T = Tset + A \times (E-B)$ by using constants A and B.

3. The motor drive device according to claim 1, wherein said dead time estimator estimates the dead time in the output stage of each of three phases, by measuring a current flow detected by said current detector for a plurality of times with changing a phase of a three-phase current.

4. The motor drive device according to claim 1, wherein said current controller adds a voltage to the voltage command by a deficiency due to the dead time or subtracts a voltage from the voltage command by an excess due to the dead time in accordance with the dead time (T) in the output stage estimated by said dead time estimator, in order to correct an effect of the dead time.

5. The motor drive device according to claim 1, wherein in estimating the dead time (T) in the output stage, said current controller operates in a specific operation mode to estimate the dead time (T) in the output stage.

6. The motor drive device according to claim 1, wherein said dead time estimator has dead time memory for storing the estimated dead time (T) in the output stage.

* * * * *